United States Patent
Oh et al.

(10) Patent No.: US 11,981,185 B2
(45) Date of Patent: May 14, 2024

(54) REFRIGERANT MODULE OF INTEGRATED THERMAL MANAGEMENT SYSTEM FOR VEHICLE

(71) Applicants: Hyundai Motor Company, Seoul (KR); Kia Corporation, Seoul (KR); Hyundai Wia Corporation, Gyeongsangnam-do (KR)

(72) Inventors: Man Ju Oh, Gyeonggi-do (KR); Sang Shin Lee, Gyeonggi-do (KR); Ki Mok Kim, Busan (KR); Man Hee Kim, Seoul (KR); Se Min Lee, Gyeonggi-do (KR); Bong Jun Park, Gyeonggi-do (KR)

(73) Assignees: Hyundai Motor Company, Seoul (KR); Kia Corporation, Seoul (KR); Hyundai Wia Corporation, Gyeongsangnam-do (KR)

( * ) Notice: Subject to any disclaimer, the term of this patent is extended or adjusted under 35 U.S.C. 154(b) by 0 days.

(21) Appl. No.: 17/972,287

(22) Filed: Oct. 24, 2022

(65) Prior Publication Data

US 2023/0143299 A1 May 11, 2023

(30) Foreign Application Priority Data

Nov. 11, 2021 (KR) .................. 10-2021-0154976

(51) Int. Cl.
*B60H 1/32* (2006.01)
(52) U.S. Cl.
CPC ................. *B60H 1/3228* (2019.05)
(58) Field of Classification Search
CPC .. B60H 1/3228; B60H 1/3229; B60H 1/3227; B60H 1/32284; F25B 43/006; B60Y 2034/01; B60Y 2304/01
See application file for complete search history.

(56) References Cited

U.S. PATENT DOCUMENTS

| 1,438,178 A | 12/1922 | Heideman |
| 5,245,836 A | 9/1993 | Lorentzen et al. |

(Continued)

OTHER PUBLICATIONS

Office Action dated Oct. 26, 2023 in U.S. Appl. No. 17/972,323.
Non-Final Office Action issued Feb. 14, 2024 in U.S. Appl. No. 17/969,861.

*Primary Examiner* — Marc E Norman
(74) *Attorney, Agent, or Firm* — Fox Rothschild LLP

(57) ABSTRACT

An integrated thermal management system for a vehicle may make refrigerant-related components compact by modularizing the refrigerant-related components. A refrigerant module of an integrated thermal management system for a vehicle according to an exemplary embodiment includes: a compressor having a first inlet port through which the refrigerant is introduced, and a first outlet port through which the compressed refrigerant is discharged; a condenser having a second inlet port through which the refrigerant discharged from the compressor is introduced, and a second outlet port through which the refrigerant, which has performed heat exchange, is discharged; an expansion valve having a third inlet port through which the refrigerant discharged from the condenser is introduced, and a third outlet port through which the expanded refrigerant is discharged; an evaporator having a fourth inlet port through which the refrigerant discharged from the expansion valve is introduced, and a fourth outlet port through which the refrigerant, which has performed heat exchange, is discharged; an accumulator having a fifth inlet port through which the refrigerant discharged from the evaporator is introduced, and fifth outlet port through which the refrigerant, which has separated into a liquid refrigerant and a gaseous refrigerant, is discharged; and a connection body configured to integrally connect the compressor, the condenser, the evaporator, and the accumulator and having a (Continued)

flow path through which the refrigerant discharged from the accumulator flows to the compressor.

13 Claims, 4 Drawing Sheets

(56) References Cited

U.S. PATENT DOCUMENTS

| | | |
|---|---|---|
| 6,105,386 A | 8/2000 | Kuroda et al. |
| 6,167,713 B1 | 1/2001 | Hartfield et al. |
| 6,178,761 B1 | 1/2001 | Karl |
| 6,523,360 B2 | 2/2003 | Watanabe et al. |
| 6,584,796 B2 | 7/2003 | Itoh et al. |
| 6,640,559 B1 | 11/2003 | McQuade |
| 6,857,280 B1 | 2/2005 | Yamanaka et al. |
| 2004/0237577 A1* | 12/2004 | Nishida ............... F25B 43/006 62/503 |
| 2005/0262873 A1 | 12/2005 | Hirota |
| 2006/0137385 A1 | 6/2006 | Take et al. |
| 2006/0185825 A1 | 8/2006 | Chen et al. |
| 2007/0125106 A1 | 6/2007 | Ishikawa et al. |
| 2007/0227165 A1 | 10/2007 | Ohta |
| 2008/0060365 A1 | 3/2008 | Sakitani et al. |
| 2009/0260386 A1 | 10/2009 | Wittmann et al. |
| 2010/0155017 A1 | 6/2010 | Lemee et al. |
| 2012/0216562 A1 | 8/2012 | Kadle et al. |
| 2019/0039440 A1* | 2/2019 | Calderone ............ B60K 7/0007 |
| 2020/0086711 A1* | 3/2020 | Kim ....................... F25B 40/02 |
| 2022/0402328 A1* | 12/2022 | Kim .................... B60H 1/3229 |
| 2023/0143363 A1* | 5/2023 | Oh ..................... B60H 1/3229 62/498 |

\* cited by examiner

REFRIGERANT MODULE OF INTEGRATED THERMAL MANAGEMENT SYSTEM FOR VEHICLE

CROSS REFERENCE TO RELATED APPLICATION

The present application claims under 35 U.S.C. § 119(a) the benefit of Korean Patent Application No. 10-2021-0154976, filed Nov. 11, 2021, the entire contents of which is incorporated herein for all purposes by this reference.

BACKGROUND OF THE DISCLOSURE

Field of the Disclosure

The present disclosure relates to a refrigerant module of an integrated thermal management system for a vehicle, and more particularly, to a refrigerant module of an integrated thermal management system for a vehicle, which makes refrigerant-related components compact by modularizing the refrigerant-related components.

Description of the Related Technology

Recently, environmentally-friendly vehicles such as electric vehicles have come into wide use to solve environmental issues caused by internal combustion engine vehicles. In the case of the internal combustion engine vehicle in the related art, waste heat from an engine may be used to heat the interior, which does not require energy for a separate heating process. However, because the environmentally friendly vehicle such as an electric vehicle has no heat source such as the engine, separate energy needs to perform the heating process, which causes deterioration in fuel economy.

In addition, the issue related to the deterioration in fuel economy in the electric vehicle decreases a travelable distance of the electric vehicle and causes the vehicle to be frequently charged, which causes discomfort.

Therefore, an air conditioning device for an environmentally friendly vehicle such as an electric vehicle may be equipped with a heat pump system that operates in a different way from a heat pump system of an air conditioning device for an internal combustion engine vehicle.

In general, a heat pump system refers to a cooling/heating device configured to transfer a low-temperature heat source to a high-temperature location or transfer a high-temperature heat source to a low temperature location by using heat generated by a refrigerant or condensation heat. The heat pump system refers to a cooling/heating system configured to absorb heat from the outside and discharge the heat to the interior at the time of heating the interior and discharge heat in the interior to the outside at the time of cooling the interior.

Meanwhile, there may be an additional need to perform thermal management not only on the air conditioning device of the environmentally friendly vehicle such as the electric vehicle, but also on electrical components such as a battery and a motor.

That is, the interior space, the battery, and the electrical components, which may be applied to the environmentally friendly vehicle such as the electric vehicle, have different needs for air conditioning, and thus there may be required a technology capable of maximally saving energy by independently coping with and efficiently and cooperatively managing the different needs. Therefore, an integrated vehicle heat management concept has been proposed in order to improve thermal efficiency by independently managing heat of the respective components and integrating the heat management of the entire vehicle.

In order to perform the integrated vehicle heat management, complicated coolant lines, refrigerant lines, and components need to be integrated and modularized. To this end, there may be required a modularization concept capable of modularizing the plurality of components, simply manufacturing the components, and implementing the compact package.

The foregoing explained as the background is intended merely to aid in the understanding of the background of the present disclosure, and is not intended to mean that the present disclosure falls within the purview of the related art that may already be known to those skilled in the art.

SUMMARY

The present disclosure may solve these problems and aims to provide a refrigerant module of an integrated thermal management system for a vehicle, which may be capable of making the complicated refrigerant-related components compact by integrating and modularizing the refrigerant-related components and lines.

A refrigerant module of an integrated thermal management system for a vehicle according to an embodiment of the present disclosure may be configured such that a refrigerant circulates through a compressor, a condenser, an expansion valve, an evaporator, and an accumulator and includes: a compressor having a first inlet port through which the refrigerant may be introduced, and a first outlet port through which the compressed refrigerant may be discharged; a condenser having a second inlet port through which the refrigerant discharged from the compressor may be introduced, and a second outlet port through which the refrigerant, which has performed heat exchange, may be discharged; an expansion valve having a third inlet port through which the refrigerant discharged from the condenser may be introduced, and a third outlet port through which the expanded refrigerant may be discharged; an evaporator having a fourth inlet port through which the refrigerant discharged from the expansion valve may be introduced, and a fourth outlet port through which the refrigerant, which has performed heat exchange, may be discharged; an accumulator having a fifth inlet port through which the refrigerant discharged from the evaporator may be introduced, and fifth outlet port through which the refrigerant, which has separated into a liquid refrigerant and a gaseous refrigerant, may be discharged; and a connection body configured to integrally connect the compressor, the condenser, the evaporator, and the accumulator and having a flow path through which the refrigerant discharged from the accumulator flows to the compressor.

The connection body may be provided in the form of a hollow pipe so that the refrigerant flows therethrough, an inflow port, which communicates with the fifth outlet port of the accumulator, may be formed at one end of the connection body, an outflow port, which communicates with the first inlet port of the compressor, may be formed at the other end of the connection body, the flow path may be formed as the inflow port and the outflow port communicate with each other, a first connection pipe, which integrally connects the compressor and the condenser, may be provided on an outer surface of the connection body, and a second connection pipe, which integrally connects the evaporator and the accumulator, may be provided on the outer surface of the connection body.

The connection body may further include: a first connection bar having one side integrally fixed to the outer surface of the connection body, and the other side extending to a space between the compressor and the condenser such that the first connection pipe may be fixed to the other end of the first connection bar; and a second connection bar having one side integrally fixed to the outer surface of the connection body, and the other side extending to a space between the evaporator and the accumulator such that the second connection pipe may be fixed to the other end of the second connection bar.

The first outlet port of the compressor and the second inlet port of the condenser may be connected by means of the first connection pipe of the connection body, the fourth outlet port of the evaporator and the fifth inlet port of the accumulator may be connected by means of the second connection pipe of the connection body, and the fifth outlet port of the accumulator and the first inlet port of the compressor may be connected by means of the flow path of the connection body.

The second outlet port of the condenser and the third inlet port of the expansion valve may be connected directly, and the third outlet port of the expansion valve and the fourth inlet port of the evaporator may be connected directly.

The second outlet port may be formed in a downward direction at a lower end of the condenser, the third inlet port may be formed in an upward direction at an upper end of the expansion valve, the third inlet port of the expansion valve may be disposed immediately below the second outlet port of the condenser, and the second outlet port and the third inlet port may communicate with each other by being connected directly.

The third outlet port may be formed in an upward direction at an upper end of the expansion valve, the fourth inlet port may be formed in a downward direction at a lower end of the evaporator, a fourth inlet port of the evaporator may be disposed immediately above the third outlet port of the expansion valve, and the third outlet port and the fourth inlet port may communicate with each other by being connected directly.

The first outlet port may be formed in an upward direction at an upper end of the compressor, the second inlet port may be formed in a downward direction at a lower end of the condenser, the first connection pipe of the connection body and the second inlet port of the condenser may be sequentially disposed immediately above the first outlet port of the compressor, and the first outlet port and the second inlet port may communicate with each other by being connected by means of the first connection pipe.

The fourth outlet port may be formed in a downward direction at a lower end of the evaporator, the fifth inlet port may be formed in an upward direction at an upper end of the accumulator, the second connection pipe of the connection body and the fifth inlet port of the accumulator may be sequentially disposed immediately below the fourth outlet port of the evaporator, and the fourth outlet port and the fifth inlet port may communicate with each other by being connected by means of the second connection pipe.

The fifth outlet port may be formed in an upward direction at an upper end of the accumulator, the first inlet port may be formed in an upward direction at an upper end of the compressor, and the fifth outlet port of the accumulator and the first inlet port of the compressor may be disposed to be spaced apart from each other in a horizontal direction and connected by means of the flow path of the connection body.

The connection body may be formed by coupling a first connection body and a second connection body, the first connection body may be provided in the form of a pipe, have the inflow port formed at one side thereof, and have an outer surface on which the first connection pipe and the second connection pipe may be provided, and the second connection body may be provided in the form of a pipe, have one side coupled to the other end of the first connection body, and have the outflow port formed at the other side thereof.

The first connection body may be formed in a straight shape, the inflow port may be opened in a downward direction in a lower region at one side of the first connection body and disposed immediately above the fifth outlet port of the accumulator, the other side of the second connection body may be bent in the downward direction, and the outflow port may be opened in the downward direction in an end region of the second connection body and disposed immediately above the first inlet port of the compressor.

The expansion valve may be integrally connected to the condenser and the evaporator as the third inlet port may be connected directly to the second outlet port of the condenser and the third outlet port may be connected directly to the fourth inlet port of the evaporator.

In a further embodiment, a vehicle may be provided that comprises the refrigerant module of an integrated thermal management system as described herein. The vehicle suitably may be for example an electric-powered vehicle.

According to the embodiment of the present disclosure, it may be possible to make the components compact by integrating and modularizing the complicated refrigerant-related components and the complicated lines.

According to the embodiment of the present disclosure, the route through which the refrigerant circulates may be minimized to a minimum route, which makes it possible to reduce the amount of circulating refrigerant and improve efficiency in exchanging heat with the coolant.

DETAILED DESCRIPTION OF THE INVENTION

Figure 1:
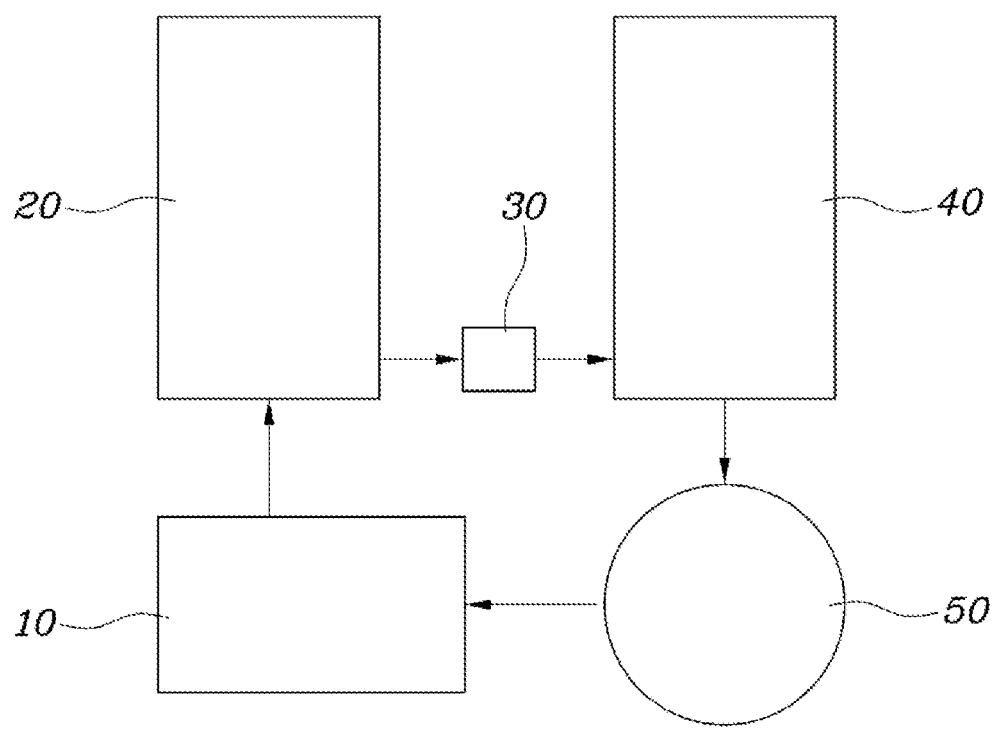
FIG. 1 is a configuration view illustrating components that constitute a refrigerant module of an integrated thermal management system for a vehicle according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

Hereinafter, embodiments of the present disclosure will be described in more detail with reference to the accompanying drawings. However, the present disclosure is not limited to the exemplary embodiment disclosed herein but will be implemented in various forms. The exemplary embodiment of the present disclosure is provided so that the present disclosure may be completely disclosed, and a person with ordinary skill in the art may fully understand the scope of the present disclosure.

FIG. 1 is a configuration view illustrating components that constitute a refrigerant module of an integrated thermal management system for a vehicle according to an embodiment of the present disclosure.

As illustrated in FIG. 1, the refrigerant module of the integrated thermal management system for a vehicle according to the embodiment of the present disclosure may be configured such that a refrigerant sequentially circulates through a compressor 10, a condenser 20, an expansion valve 30, an evaporator 40, and an accumulator 50.

In more detail, the refrigerant may be compressed in the compressor 10, flows to the condenser 20, and then radiates heat while exchanging heat with a coolant. The refrigerant, which has radiated heat as described above, flows to the expansion valve 30 and may be expanded. Further, the refrigerant, which has expanded in the expansion valve 30, flows to the evaporator 40 and absorbs heat while exchanging heat with the coolant. Then, the refrigerant flows into the accumulator 50. The accumulator 50 separates the gaseous refrigerant and the liquid refrigerant and allows the gaseous refrigerant to flow to the compressor 10.

The refrigerant circulates sequentially through the compressor 10, the condenser 20, the expansion valve 30, the evaporator 40, and the accumulator 50 and heats or cools the coolant while exchanging heat with the coolant.

Meanwhile, in the related technology, a refrigerant, which circulates between a compressor, a condenser, an expansion valve, an evaporator, and an accumulator, flows through a connection pipe or a connection hose that connects the components. In contrast, according to the present disclosure, the compressor 10, the condenser 20, the expansion valve 30, the evaporator 40, and the accumulator 50 may be directly connected to one another by improving the arrangement of the compressor 10, the condenser 20, the expansion valve 30, the evaporator 40, and the accumulator 50. Therefore, the connection pipe or the connection hose, in which the refrigerant flows, may be removed or minimized, such that the refrigerant-related components and lines may be modularized.

Figure 2:
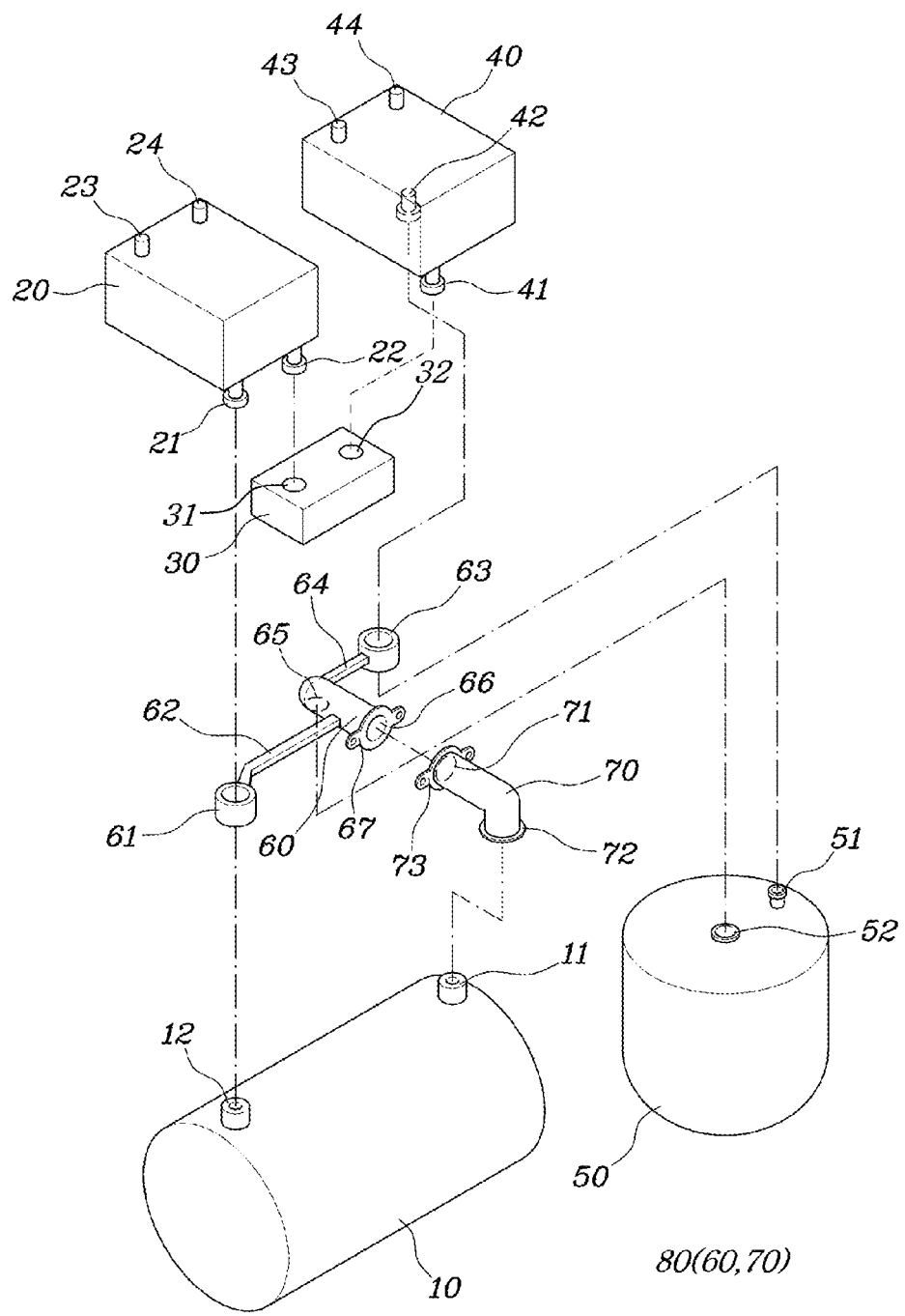
FIG. 2 is an exploded perspective view illustrating the refrigerant module of the integrated thermal management system for a vehicle according to the embodiment of the present disclosure.
Figure 3:
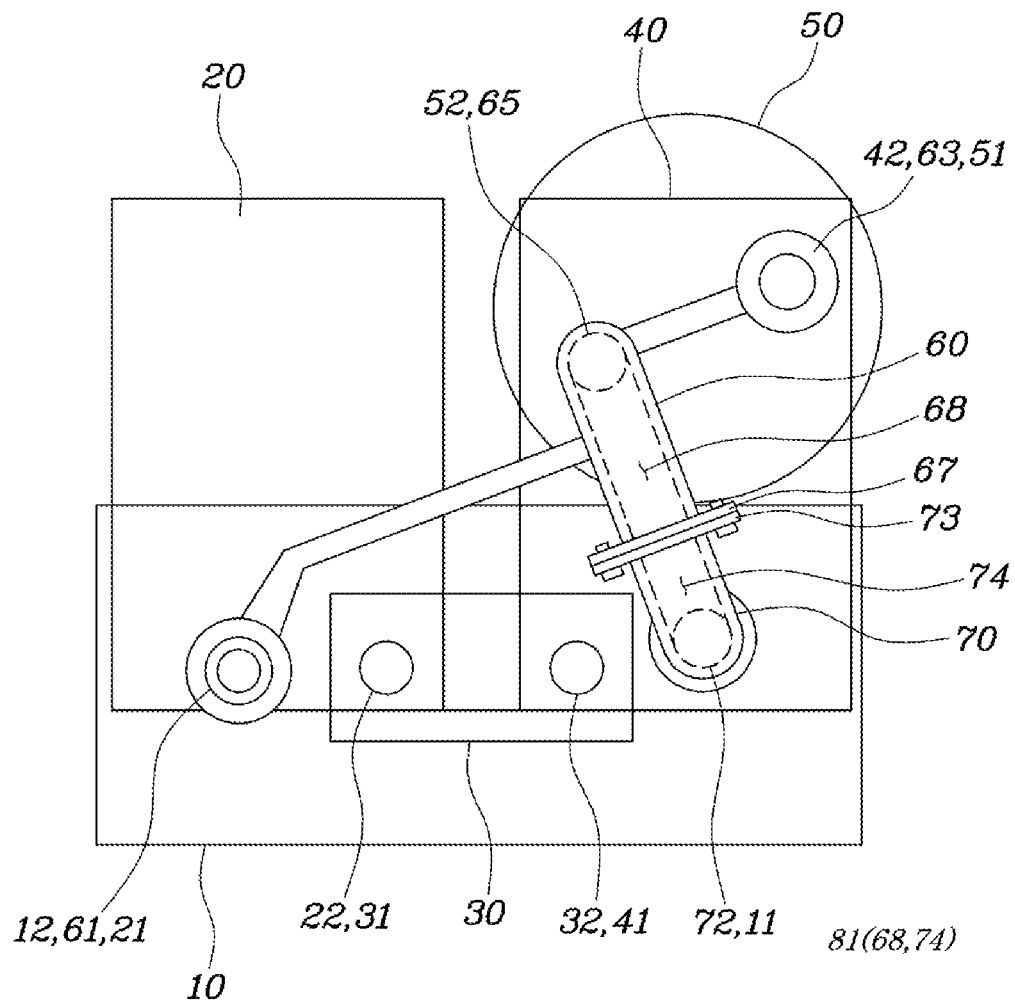
FIG. 3 is a top plan view illustrating the refrigerant module of the integrated thermal management system for a vehicle according to the embodiment of the present disclosure.
Figure 4:
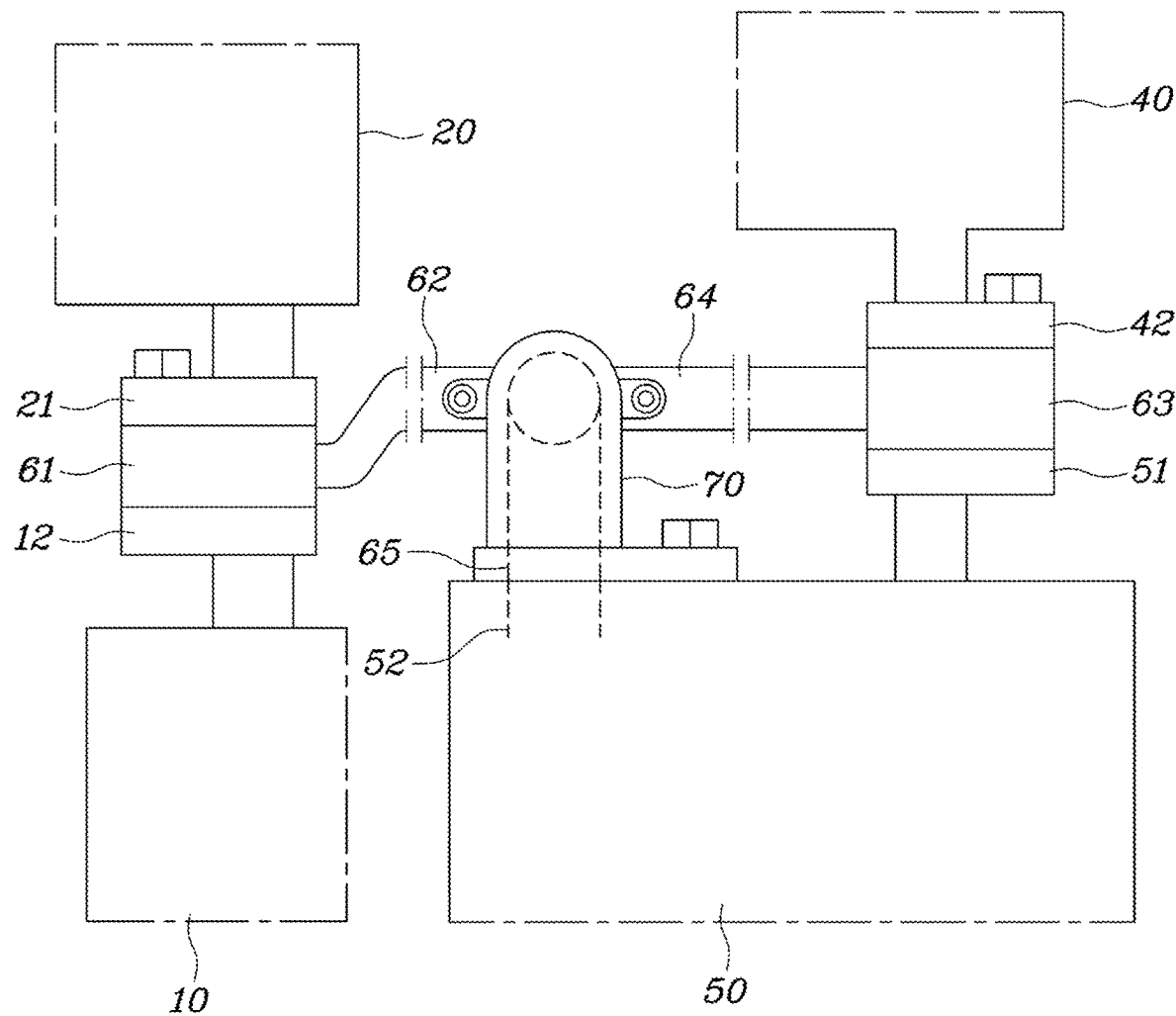
FIG. 4 is a front view illustrating the refrigerant module of the integrated thermal management system for a vehicle according to the embodiment of the present disclosure.

FIG. 2 is an exploded perspective view illustrating the refrigerant module of the integrated thermal management system for a vehicle according to the embodiment of the present disclosure, FIG. 3 is a top plan view illustrating the refrigerant module of the integrated thermal management system for a vehicle according to the embodiment of the present disclosure, and FIG. 4 is a front view illustrating the refrigerant module of the integrated thermal management system for a vehicle according to the embodiment of the present disclosure.

As described above, the refrigerant module of the integrated thermal management system for a vehicle according to the embodiment of the present disclosure has the refrigerant-related components and the lines which may be modularized. The refrigerant-related components include the compressor 10, the condenser 20, the expansion valve 30, the evaporator 40, and the accumulator 50. Only a single connection body 80 may be provided as the line through which the refrigerant flows, and the connection body 80 has a flow path 81 in which the refrigerant flows between the compressor 10 and the accumulator 50.

In this case, the components, which includes the compressor 10, the condenser 20, the expansion valve 30, the evaporator 40, and the accumulator 50, may be manufactured in various shapes that allow the components to perform functions thereof. In particular, internal configurations of the compressor 10, the condenser 20, the expansion valve 30, the evaporator 40, and the accumulator 50 may be not limited as long as the internal configurations may perform the functions of the components.

However, in the present embodiment, to minimize the line, through which the refrigerant flows, by improving the arrangement relationship and the connection relationship between the compressor 10, the condenser 20, the expansion valve 30, the evaporator 40, and the accumulator 50, positions and opening directions of ports of the compressor 10, the condenser 20, the expansion valve 30, the evaporator 40, and the accumulator 50, through which the refrigerant may be introduced and discharged, may be limited.

In more detail, the compressor 10 has a first inlet port 11 through which the refrigerant may be introduced from the accumulator 50, and a first outlet port 12 through which the compressed refrigerant may be discharged. The condenser 20 has a second inlet port 21 through which the refrigerant discharged from the compressor 10 may be introduced, and a second outlet port 22 through which the refrigerant, which has performed heat exchange, may be discharged. In this case, the condenser 20 has a first inlet port 23 through which the coolant, which exchanges heat with the refrigerant, may be introduced, and a first outlet port 24 through which the coolant, which has performed the heat exchange, may be discharged.

Further, the expansion valve 30 has a third inlet port 31 through which the refrigerant discharged from the condenser 20 may be introduced, and a third outlet port 32 through which the expanded refrigerant may be discharged. The evaporator 40 has a fourth inlet port 41 through which the refrigerant discharged from the expansion valve 30 may be introduced, and a fourth outlet port 42 through which the refrigerant, which has performed the heat exchange, may be discharged. In this case, the evaporator 40 has a second inlet port 43 through which the coolant, which has exchanged heat with the refrigerant, may be introduced, and a second outlet port 44 through which the coolant, which has performed the heat exchange, may be discharged.

In addition, the accumulator 50 has a fifth inlet port 51 through which the refrigerant discharged from the evaporator 40 may be introduced, and a fifth outlet port 52 through which the refrigerant, which has been separated into the liquid refrigerant and the gaseous refrigerant, may be discharged.

Further, the connection body 80 may be disposed between the accumulator 50 and the compressor 10, and the connection body 80 has the flow path 70 through which the refrigerant discharged from the accumulator 50 flows to the compressor.

In this case, the connection body 80 is disposed between the accumulator 50 and the compressor 10 and has the flow path 70 through which the refrigerant discharged from the accumulator 50 flows to the compressor 10. Further, the connection body 80 serves to integrally connect the compressor 10, the condenser 20, the evaporator 40, and the accumulator 50.

To this end, the connection body 80 may be provided in the form of a hollow pipe through which the refrigerant flows. An inflow port 65, which communicates with the fifth outlet port 52 of the accumulator 50, may be formed at one end of the connection body 80, an outflow port 72, which communicates with the first inlet port 11 of the compressor 10, may be formed at the other end, and the inflow port 65 and the outflow port 72 communicate with each other to define the flow path 81.

Further, on an outer surface of the connection body 80, a first connection pipe 61, which integrally connects the compressor 10 and the condenser 20, may be provided, and a second connection pipe 63, which integrally connects the evaporator 40 and the accumulator 50, may be provided.

In this case, the first connection pipe 61 and the second connection pipe 63 may communicate with each other in an upward/downward direction, thereby providing a space in which the refrigerant flows. Further, a height, at which the first connection pipe 61 may be formed, may be set to correspond to an interval between the compressor 10 and the condenser 20, particularly, correspond to an interval between the first outlet port 12 of the compressor 10 and the second inlet port 21 of the condenser 20. In addition, a height, at which the second connection pipe 63 may be formed, may be set to correspond to an interval between the evaporator 40 and the accumulator 50, particularly, correspond to an interval between the fourth outlet port 42 of the evaporator 40 and the fifth inlet port 51 of the accumulator 50.

Further, the connection body 80 has a first connection bar 62 and a second connection bar 64 in order to position the first and second connection pipes 61 and 63 at desired positions, i.e., position the first connection pipe 61 in a space between the compressor 10 and the condenser 20 and position the second connection pipe 63 in a space between the evaporator 40 and the accumulator 50.

In more detail, one side of the first connection bar 62 may be integrally fixed to the outer surface of the connection body 80, and the other side of the first connection bar 62 extends to a space between the compressor 10 and the condenser 20, particularly, extends to a space between the first outlet port 12 of the compressor 10 and the second inlet port 21 of the condenser 20, such that the first connection pipe 61 may be fixed to an end of the first connection bar 62.

Further, one side of the second connection bar 64 may be integrally fixed to the outer surface of the connection body 80, and the other side of the second connection bar 64 extends to a space between the evaporator 40 and the accumulator 50, particularly, extends to a space between the fourth outlet port 42 of the evaporator 40 and the fifth inlet port 51 of the accumulator 50, such that the second connection pipe 63 may be fixed to an end of the second connection bar 64.

In particular, the first and second connection bars 62 and 64 may be means for integrally connecting the compressor 10, the condenser 20, the evaporator 40, and the accumulator 50, and the shapes and forms thereof may be not limited, but the first and second connection bars 62 and 64 may maintain sufficient rigidity thereof to integrally support the compressor 10, the condenser 20, the evaporator 40, and the accumulator 50.

In this case, the connection body 80 has a part structurally bent downward to connect the fifth outlet port 52 of the accumulator 50 and the first inlet port 11 of the compressor 10 which may be disposed to be spaced apart from each other. Further, the connection body 80 preferably has the first connection bar 62, the first connection pipe 61, the second connection bar 64, and the second connection pipe 63 in a horizontal direction. Therefore, the connection body 80 may be implemented by manufacturing a plurality of divided elements and then coupling the plurality of divided elements to make it easy to manufacture the connection body 80.

For example, as illustrated in FIGS. 2 and 3, the connection body 80 may be configured by coupling a first connection body 60 and a second connection body 70. The first connection body 60 may be provided in the form of a pipe, has the inflow port 65 at one side thereof, and has the first connection pipe 61 and the second connection pipe 63 on an outer surface thereof. The second connection body 70 may be provided in the form of a pipe, has one side coupled to the other end of the first connection body 60, and has the outflow port 72 at the other side thereof.

Therefore, the first connection body 60 may be manufactured in a straight shape, and then the first connection bar 62, the first connection pipe 61, the second connection bar 64, and the second connection pipe 63 may be provided on an outer surface of the first connection body 60. In this case, the first connection bar 62, the first connection pipe 61, the second connection bar 64, and the second connection pipe 63 may be integrated through a single molding process instead of being separately manufactured and then coupled, such that the first connection body 60 may sufficiently rigidly support the compressor 10, the condenser 20, the evaporator 40, and the accumulator 50.

Further, the other side of the second connection body 70 may be bent downward, and then the first connection body 60 and the second connection body 70 may be coupled to each other, thereby implementing the connection body 80.

In this case, a first communication hole 66, which communicates with the inflow port 65, may be formed at the other end of the first connection body 60, and a first flange 67, which may be coupled to the second connection body 70, may be provided at the periphery of the first communication hole 66. Further, a second communication hole 71, which communicates with the first communication hole 66 and the outflow port 72, may be formed at one end of the second connection body 70, and a second flange 73, which may be coupled to the first flange 67, may be provided at the periphery of the second communication hole 71. Therefore, a first flow path 68 formed in the first connection body 60 and a second flow path 74 formed in the second connection body 70 may communicate with each other as the first communication hole 66 and the second communication hole 71 communicate with each other, such that the flow path 81 may be formed.

In particular, the first connection body 60 may be formed in a straight shape, and the inflow port 65 may be opened downward in a lower region at one side of the first connection body 60 and disposed immediately above the fifth outlet port 52 of the accumulator 50.

Further, the second connection body 70 may be formed such that the other side thereof may be bent downward and the outflow port 72 may be opened downward in an end region of the second connection body 70 and disposed immediately above the first inlet port 11 of the compressor 10.

Therefore, according to the order of the components through which the refrigerant flows, the first outlet port 12 of the compressor 10 and the second inlet port 21 of the condenser 20 may communicate with each other by being connected by means of the first connection pipe 61 of the connection body 80, and the second outlet port 22 of the condenser 20 and the third inlet port 31 of the expansion valve 30 may be directly connected.

Further, the third outlet port 32 of the expansion valve 30 and the fourth inlet port 41 of the evaporator 40 may be directly connected, and the fourth outlet port 42 of the evaporator 40 and the fifth inlet port 51 of the accumulator 50 may be connected by means of the second connection pipe 63 of the connection body 80.

In addition, the fifth outlet port 52 of the accumulator 50 and the first inlet port 11 of the compressor 10 may be connected by means of the flow path 70 formed in the connection body 80.

To implement this connection, the compressor 10 and the accumulator 50 may be disposed side by side in the horizontal direction, and the condenser 20 and the evaporator 40 may be disposed side by side in the horizontal direction in a region above the compressor 10 and the accumulator 50. Further, the expansion valve 30 may be disposed so that upper ends of two opposite sides of the expansion valve 30 may be respectively fixed to a lower end of the condenser 20 and a lower end of the evaporator 40.

Further, with this arrangement, the ports of the compressor 10 and the accumulator 50, through which the refrigerant may be introduced and discharged, may be formed in the upward direction.

For example, the first inlet port 11 and the first outlet port 12 may be formed at an upper end of the compressor 10 and directed in the upward direction. Further, likewise, the fifth inlet port 51 and the fifth outlet port 52 may be formed at an upper end of the accumulator 50 and directed in the upward direction.

In contrast, the ports of the condenser 20 and the evaporator 40, through which the refrigerant may be introduced and discharged, may be formed in the downward direction.

For example, the second inlet port 21 and the second outlet port 22 may be formed at a lower end of the condenser 20 and directed in the downward direction. Further, likewise, the fourth inlet port 41 and the fourth outlet port 42 may be formed at a lower end of the evaporator 40 and directed in the downward direction.

In addition, the third inlet port 31, through which the refrigerant may be introduced, and the third outlet port 32, through which the refrigerant may be discharged, may be formed at an upper end of the expansion valve 30 and directed in the upward direction.

Therefore, the connection body 80 and the condenser 20 may be disposed above the compressor 10 so that the first connection pipe 61 of the connection body 80 and the second inlet port 21 of the condenser 20 may be sequentially disposed immediately above the first outlet port 12 of the compressor 10. Further, the first outlet port 12 and the second inlet port 21 may be connected by means of the first connection pipe 61, such that the refrigerant directly flows between the compressor 10 and the condenser 20.

Further, the condenser 20 and the evaporator 40 may be disposed in the horizontal direction, and then the connection body 80 and the accumulator 50 may be disposed below the condenser 20 so that the second connection pipe 63 of the connection body 80 and the fifth inlet port 51 of the accumulator 50 may be disposed immediately below of the fourth outlet port 42 of the evaporator 40. Further, the fourth outlet port 42 and the fifth inlet port 51 may be connected by means of the second connection pipe 63, such that the refrigerant directly flows between the evaporator 40 and the accumulator 50.

In addition, the expansion valve 30 may be disposed below the condenser 20 and the evaporator 40, the third inlet port 31 of the expansion valve 30 may be disposed immediately below the second outlet port 22 of the condenser 20, and then the fourth inlet port 41 of the evaporator 40 may be disposed immediately above the third outlet port 32 of the expansion valve 30. Therefore, the second outlet port 22 and the third inlet port 31 may be connected directly so that the refrigerant directly flows between the condenser 20 and the expansion valve 30 without another separate connection component. Further, the third outlet port 32 and the fourth inlet port 41 may be connected directly so that the refrigerant directly flows between the expansion valve 30 and the evaporator 40 without another separate connection component.

In addition, the fifth outlet port 52 of the accumulator 50 and the first inlet port 11 of the compressor 10 need to be connected to introduce the refrigerant, which may be discharged from the accumulator 50, into the compressor 10. Since both the first inlet port 11 of the compressor 10 and the fifth outlet port 52 of the accumulator 50 may be formed in the upward direction and the compressor 10 and the accumulator 50 may be disposed side by side in the horizontal direction, the connection body 80 may be disposed between the first inlet port 11 and the fifth outlet port 52, such that the first inlet port 11 and the fifth outlet port 52 may be connected indirectly by means of the flow path 81 formed in the connection body 80.

In this case, the fifth outlet port 52 of the accumulator 50 may be connected to the inflow port 65 of the connection body 80, and the first inlet port 11 of the compressor 10 may be connected to the outflow port 72 of the connection body 80.

The embodiments described in the instant disclosure may use reference to "up", "down" in order to ease the description of the components and provide orientations and directions for the respective component parts. The "upward", "downward", "forward", and "backward" directions are intended to provide an orthogonal reference frame in which components parts may be oriented relative to each other. In an exemplary embodiment, the orientation may be in reference to the components as installed or used within a vehicle. However, the disclosure is not so limited. The orientation of "up" may be opposite the orientation of "down" and orthogonal to "horizontal", "front" and "back". The orientation of "up" does not necessitate an upward direction relative to the gravitational pull of the Earth in which an object falls "down", but may do so. The directions of "up" and "down" are intended to be consistent between components parts such that an upward direction of the compressor for example is in the same direction as an upward direction on the accumulator or expansion valve, for example.

A refrigerant module of an integrated thermal management system for a vehicle described herein may include a compressor configured to compress a refrigerant, the compressor having a first inlet port through which the refrigerant is introduced, and a first outlet port through which the refrigerant compressed by the compressor is discharged; a condenser configured to cool the refrigerant, the condenser having a second inlet port through which the refrigerant discharged from the compressor is introduced, and a second outlet port through which the refrigerant cooled by the condenser is discharged; an expansion valve configured to expand the refrigerant, the expansion valve having a third inlet port through which the refrigerant discharged from the condenser is introduced, and a third outlet port through which the refrigerant expanded from the expansion valve is discharged; an evaporator configured to evaporate the refrigerant by heating the refrigerant, the evaporator having a fourth inlet port through which the refrigerant discharged from the expansion valve is introduced, and a fourth outlet port through which the refrigerant heated by the evaporator is discharged; an accumulator configured to separate the refrigerant into a liquid refrigerant and a gaseous refrigerant, the accumulator having a fifth inlet port through which the refrigerant discharged from the evaporator is introduced, and fifth outlet port through which the refrigerant which has separated into the liquid refrigerant and the gaseous refrigerant is discharged; and a connection body configured to integrally connect the compressor, the condenser, the evaporator, and the accumulator and having a flow path through which the refrigerant discharged from the accumulator flows to the compressor. The refrigeration module may be configured such that the second inlet port of the condenser directly connects or connects through the connection body to the first outlet port of the compressor, the second outlet port of the condenser directly connects to the third inlet port of the expansion valve, the third outlet port of the expansion value directly connects to the fourth inlet port of the evaporator, the fourth outlet port of the evaporator directly connects or connects through the connection body to the fifth inlet port of the accumulator, and the connection body is configured to connect the fifth outlet port of the accumulator to the first inlet port of the compressor.

In an exemplary embodiment, the refrigeration module may include only a single connection body. The single connection body may include an inflow port, which communicates with the fifth outlet port of the accumulator, and an outflow port, which communicates with the first inlet port of the compressor. A flow path may be formed as the inflow port and the outflow port of the single connection body communicate with each other. The connection body may also comprise a first connection pipe, which integrally connects the compressor and the condenser. The first connection pipe may be provided on an outer surface of the connection body. The connection body may comprise a second connection pipe, which integrally connects the evaporator and the accumulator. The second connection pipe may be provided on the outer surface of the connection body.

In an exemplary embodiment, the refrigeration module may include only two connection bodies directly coupled together to form a single connection body when assembled. A first connection body may be coupled to a second connection body. The first connection body may be provided in the form of a pipe, has the inflow port formed at one side thereof, and has an outer surface on which the first connection pipe and the second connection pipe are provided. The second connection body may be provided in the form of a pipe, has one side coupled to the other end of the first connection body, and has the outflow port formed at the other side thereof. The first connection body may be formed in a straight shape, the inflow port is opened in a downward direction in a lower region at one side of the first connection body and disposed immediately above the fifth outlet port of the accumulator, the other side of the second connection body may be bent in the downward direction, and the outflow port opened in the downward direction in an end region of the second connection body and disposed immediately above the first inlet port of the compressor.

In an exemplary embodiment, the connection body may comprise separate flow paths to connect different components of the compressor, the condenser, the expansion valve, the evaporator, and the accumulator to each other while providing a single body for reduced integration for a smaller footprint.

While the present disclosure has been described with reference to the accompanying drawings and the aforementioned exemplary embodiments, but the present disclosure may be not limited thereto but defined by the appended claims. Therefore, those skilled in the art may variously change and modify the present disclosure without departing from the technical spirit of the appended claims.

What is claimed is:

1. A refrigerant module of an integrated thermal management system for a vehicle comprising:
    a compressor configured to compress a refrigerant, the compressor having a first inlet port through which the refrigerant is introduced, and a first outlet port through which the refrigerant compressed by the compressor is discharged;
    a condenser configured to cool the refrigerant, the condenser having a second inlet port through which the refrigerant discharged from the compressor is introduced, and a second outlet port through which the refrigerant cooled by the condenser is discharged;
    an expansion valve configured to expand the refrigerant, the expansion valve having a third inlet port through which the refrigerant discharged from the condenser is introduced, and a third outlet port through which the refrigerant expanded from the expansion valve is discharged;
    an evaporator configured to evaporate the refrigerant by heating the refrigerant, the evaporator having a fourth inlet port through which the refrigerant discharged from the expansion valve is introduced, and a fourth outlet port through which the refrigerant heated by the evaporator is discharged;
    an accumulator configured to separate the refrigerant into a liquid refrigerant and a gaseous refrigerant, the accumulator having a fifth inlet port through which the refrigerant discharged from the evaporator is introduced, and fifth outlet port through which the refrigerant which has separated into the liquid refrigerant and the gaseous refrigerant is discharged; and
    a connection body configured to integrally connect the compressor, the condenser, the evaporator, and the accumulator and having a flow path through which the refrigerant discharged from the accumulator flows to the compressor,
    wherein the connection body is a hollow pipe so that the refrigerant flows therethrough,
    wherein an inflow port, which communicates with the fifth outlet port of the accumulator, is formed at one end of the connection body,
    wherein an outflow port, which communicates with the first inlet port of the compressor, is formed at an other end of the connection body,
    wherein the flow path is formed as the inflow port and the outflow port communicate with each other,
    wherein a first connection pipe, which integrally connects the compressor and the condenser, is provided on an outer surface of the connection body, and
    wherein a second connection pipe, which integrally connects the evaporator and the accumulator, is provided on the outer surface of the connection body.

2. The refrigerant module of claim 1, wherein the connection body further comprises:
    a first connection bar having one side integrally fixed to the outer surface of the connection body, and an other side of the first connection bar extending to a space between the compressor and the condenser such that the first connection pipe is fixed to the other side of the first connection bar; and
    a second connection bar having one side integrally fixed to the outer surface of the connection body, and an other side of the second connection bar extending to a space between the evaporator and the accumulator such that the second connection pipe is fixed to the other side of the second connection bar.

3. The refrigerant module of claim 1, wherein the first outlet port of the compressor and the second inlet port of the condenser are connected by the first connection pipe of the connection body, the fourth outlet port of the evaporator and the fifth inlet port of the accumulator are connected by the second connection pipe of the connection body, and the fifth outlet port of the accumulator and the first inlet port of the compressor are connected by the flow path of the connection body.

4. The refrigerant module of claim 3, wherein the second outlet port of the condenser and the third inlet port of the expansion valve are connected directly, and the third outlet port of the expansion valve and the fourth inlet port of the evaporator are connected directly.

5. The refrigerant module of claim 4, wherein the second outlet port is formed in a downward direction at a lower end of the condenser, the third inlet port is formed in an upward direction at an upper end of the expansion valve, the third inlet port of the expansion valve is disposed immediately below the second outlet port of the condenser, and the second outlet port and the third inlet port communicate with each other by being connected directly.

6. The refrigerant module of claim 3, wherein the first outlet port is formed in an upward direction at an upper end of the compressor, the second inlet port is formed in a downward direction at a lower end of the condenser, the first connection pipe of the connection body and the second inlet port of the condenser are sequentially disposed immediately above the first outlet port of the compressor, and the first outlet port and the second inlet port communicate with each other by being connected by means of the first connection pipe.

7. The refrigerant module of claim 3, wherein the fourth outlet port is formed in a downward direction at a lower end of the evaporator, the fifth inlet port is formed in an upward direction at an upper end of the accumulator, the second connection pipe of the connection body and the fifth inlet port of the accumulator are sequentially disposed immediately below the fourth outlet port of the evaporator, and the fourth outlet port and the fifth inlet port communicate with each other by being connected by means of the second connection pipe.

8. The refrigerant module of claim 3, wherein the fifth outlet port is formed in an upward direction at an upper end of the accumulator, the first inlet port is formed in an upward direction at an upper end of the compressor, and the fifth outlet port of the accumulator and the first inlet port of the compressor are disposed to be spaced apart from each other in a horizontal direction and connected by means of the flow path of the connection body.

9. The refrigerant module of claim 1, wherein the third outlet port is formed in an upward direction at an upper end of the expansion valve, the fourth inlet port is formed in a downward direction at a lower end of the evaporator, a fourth inlet port of the evaporator is disposed immediately above the third outlet port of the expansion valve, and the third outlet port and the fourth inlet port communicate with each other by being connected directly.

10. The refrigerant module of claim 1, wherein the connection body is formed by coupling a first connection body and a second connection body, the first connection body is provided in the form of a first pipe, has the inflow port formed at one side thereof, and has an outer surface on which the first connection pipe and the second connection pipe are provided, and the second connection body is provided in the form of a second pipe, has one side coupled to the other end of the first connection body, and has the outflow port formed at the other side thereof.

11. The refrigerant module of claim 10, wherein the first connection body is formed in a straight shape, the inflow port is opened in a downward direction in a lower region at one side of the first connection body and disposed immediately above the fifth outlet port of the accumulator, the other side of the second connection body is bent in the downward direction, and the outflow port is opened in the downward direction in an end region of the second connection body and disposed immediately above the first inlet port of the compressor.

12. The refrigerant module of claim 1, wherein the expansion valve is integrally connected to the condenser and the evaporator as the third inlet port is connected directly to the second outlet port of the condenser and the third outlet port is connected directly to the fourth inlet port of the evaporator.

13. A vehicle comprising a refrigerant module of the integrated thermal management system of claim 1.

* * * * *